(12) United States Patent
Ding et al.

(10) Patent No.: US 9,665,207 B2
(45) Date of Patent: May 30, 2017

(54) IN-CELL TOUCH PANEL, TOUCH DETECTION METHOD AND DISPLAY DEVICE

(71) Applicants: Boe Technology Group Co., Ltd., Beijing (CN); Beijing Boe Optoelectronics Technology Co., Ltd., Beijing (CN)

(72) Inventors: Xiaoliang Ding, Beijing (CN); Xue Dong, Beijing (CN); Haisheng Wang, Beijing (CN); Yingming Liu, Beijing (CN); Wei Liu, Beijing (CN)

(73) Assignees: Boe Technology Group Co., Ltd., Beijing (CN); Beijing Boe Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/907,033

(22) PCT Filed: Aug. 20, 2015

(86) PCT No.: PCT/CN2015/087699
§ 371 (c)(1),
(2) Date: Jan. 22, 2016

(87) PCT Pub. No.: WO2016/123963
PCT Pub. Date: Aug. 11, 2016

(65) Prior Publication Data
US 2016/0370925 A1 Dec. 22, 2016

(30) Foreign Application Priority Data
Feb. 2, 2015 (CN) .......................... 2015 1 0054298

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04111* (2013.01)

(58) Field of Classification Search
CPC ....................................................... G06F 3/044
(Continued)

(56) References Cited

U.S. PATENT DOCUMENTS

2011/0279409 A1* 11/2011 Salaverry .............. G06F 3/0416
345/174
2012/0262419 A1* 10/2012 Hershman ............... G06F 3/044
345/174

(Continued)

FOREIGN PATENT DOCUMENTS

CN 103258492 8/2013
CN 103970392 8/2014
(Continued)

OTHER PUBLICATIONS

International Search Report and Written Opinion from PCT/CN15/087699 dated Dec. 11, 2015.
(Continued)

*Primary Examiner* — Roy Rabindranath
(74) *Attorney, Agent, or Firm* — Calfee, Halter & Griswold LLP

(57) ABSTRACT

An in cell touch panel, a touch detection method and a display device. The in-cell touch panel comprises: a substrate, a plurality of self-capacitance electrodes located on said substrate and arranged in an array, and a touch sensing unit for determining the touch position by sensing capacitance value changes on the self-capacitance electrodes. The number of elements in each column of self-capacitance electrodes is n and there is a submultiple m of n, and a first column of self-capacitance electrodes includes n/m groups (Continued)

of self-capacitance electrodes divided in the sequence of column adjacency. Each group includes m self-capacitance electrodes and the self-capacitance electrodes in the same group are electrically connected by the same wire. The second column of self-capacitance electrodes include m groups of self-capacitance electrodes, each group includes n/m self-capacitance electrodes and the self-capacitance electrodes in the same group are electrically connected by a second wire.

10 Claims, 8 Drawing Sheets

(58) Field of Classification Search
USPC .................................................. 345/173–174
See application file for complete search history.

(56) References Cited

U.S. PATENT DOCUMENTS

| 2014/0327644 | A1 | 11/2014 | Mohindra |
| 2014/0354572 | A1* | 12/2014 | Zhao ..................... G06F 3/0412 |
| | | | 345/173 |
| 2016/0170528 | A1* | 6/2016 | Wu .......................... G06F 1/22 |
| | | | 345/174 |

FOREIGN PATENT DOCUMENTS

| CN | 104020912 | 9/2014 |
| CN | 104267862 | 1/2015 |
| CN | 104671770 | 4/2015 |

OTHER PUBLICATIONS

Office Action from China Application No. 201510054298.9 dated Feb. 20, 2017.

* cited by examiner

IN-CELL TOUCH PANEL, TOUCH DETECTION METHOD AND DISPLAY DEVICE

RELATED APPLICATIONS

The present application is the U.S. national phase entry of PCT/CN2015/087699, with an international filing date of Aug. 20, 2015, which claims the benefit of Chinese Patent Application No. 201510054298.9, filed on Feb. 2, 2015, the entire disclosure of which are incorporated herein by reference.

FIELD OF THE INVENTION

The present invention relates to the technical field of touch control, in particular to an in-cell touch panel, a touch detection method and a display device.

BACKGROUND OF THE INVENTION

With the fast development of display technologies, touch screen panels have been widely used in people's daily lives. Currently, touch screen panels can be classified into add-on mode panels, on-cell touch panels and in-cell touch panel according to the composition thereof, wherein the add-on model panel is a liquid crystal display panel having a touch function, which is formed by separately manufacturing a touch panel and a liquid crystal display (LCD) and then bonding them together. The add-on model panel has such disadvantages as high manufacturing cost, low light transmissivity and thick module. The in-cell touch panel has the touch electrode of the touch panel embedded inside the liquid crystal display, thus reducing thickness of the whole module and greatly reducing manufacturing cost of the touch panel, so it is favored by major panel manufacturers.

In the in-cell touch panel, there are a plurality of self-capacitance electrodes that are arranged in the same layer and are insulated from one another, when the panel is not touched by a human body, the capacitance withstood by each self-capacitance electrode is a fixed capacitance; but when the panel is touched by a human body, the capacitance withstood by the corresponding self-capacitance electrode is the fixed capacitance plus a body capacitance. In this way, a touch sensing unit can determine the touch position by sensing the capacitance value change of each self-capacitance electrode in the time period of touch.

FIG. 1 shows a structural diagram of an in-cell touch panel in the prior art. In the in-cell touch panel 10 shown in FIG. 1, a plurality of self-capacitance electrodes 11 are arranged in an array and each self-capacitance electrode 11 needs to be connected to the touch sensing unit 12 via its corresponding wire 13 so as to determine the touch position, as a result, a lot of wires 13 are needed.

SUMMARY OF THE INVENTION

To overcome the above-mentioned defects, the present invention provides an in-cell touch panel, a touch detection method and a display device to reduce the number of wires that are required for determining the touch position in the prior art.

According to one aspect of the present invention, an in-cell touch panel is provided, comprising: a substrate, a plurality of self-capacitance electrodes located on the substrate and arranged in an array, and a touch sensing unit for determining the touch position by sensing capacitance value changes on the self-capacitance electrodes, the self-capacitance electrodes being electrically connected to the touch sensing unit via wires including a first wire and a second wire; wherein the array of the self-capacitance electrodes comprises a first column of self-capacitance electrodes and a second column of self-capacitance electrodes arranged in alternation, the number of elements in each column of self-capacitance electrodes is n and there is a submultiple m of n, wherein n and m are both positive integers and n is greater than 1, and the first column of self-capacitance electrodes includes n/m groups of self-capacitance electrodes divided in the sequence of column adjacency, each group includes m self-capacitance electrodes and the self-capacitance electrodes in the same group are electrically connected by the same first wire; the second column of self-capacitance electrodes include m groups of self-capacitance electrodes, each group includes n/m self-capacitance electrodes and the self-capacitance electrodes in the same group are electrically connected by the same second wire; wherein n/m self-capacitance electrodes in the same group in the second column of self-capacitance electrodes are respectively formed by self-capacitance electrodes, in the second column of self-capacitance electrodes, which are respectively in row adjacency with the self-capacitance electrodes of different groups in the first column of self-capacitance electrodes.

In the in-cell touch panel according to the present invention, since the first column of self-capacitance electrodes include n/m groups of self-capacitance electrodes altogether, the number of wires required is n/m; likewise, the second column of self-capacitance electrodes include m groups of self-capacitance electrodes altogether, so the number of wires required is m, in this case, n/m+m wires are needed for connecting two adjacent columns of self-capacitance electrodes to the touch sensing unit. Therefore, compared to the wire number 2n in the prior art, the in-cell touch panel according to the present invention significantly reduces the number of wires required for connecting the self-capacitance electrodes to the touch sensing unit so as to determine the touch position, and when n is large, the number reduction is more distinct.

Preferably, in the in-cell touch panel according to the present invention, the self-capacitance electrodes in each group of self-capacitance electrodes in the second column of self-capacitance electrodes are respectively in row adjacency to the self-capacitance electrodes having the same positional sequence in each group of self-capacitance electrodes in the first column.

In the in-cell touch panel according to the present invention, in order to determine the touch position more accurately, the shape of the self-capacitance electrode can be a square or a rectangle having one side length to be twice the adjacent side length.

In the in-cell touch panel according to the present invention, the in-cell touch panel may further comprise a plurality of additional self-capacitance electrodes, which are electrically connected to the touch sensing unit through an individual third wire.

According to a second aspect of the present invention, another kind of in-cell touch panel is provided, which comprises: a substrate, a plurality of self-capacitance electrodes located on the substrate and arranged in an array, and a touch sensing unit for determining the touch position by sensing capacitance value changes on the self-capacitance electrodes, the self-capacitance electrodes being electrically connected to the touch sensing unit via wires including a first wire and a second wire; wherein the array of self-capacitance electrodes comprises a first row of self-capacitance electrodes and a second row of self-capacitance electrodes arranged in alternation, the number of elements in each row of self-capacitance electrodes is n and there is a submultiple m of n, wherein n and m are both positive integers and n is greater than 1, and the first row of self-capacitance electrodes includes n/m groups of self-capacitance electrodes divided in the sequence of row adjacency, each group includes m self-capacitance electrodes and the self-capacitance electrodes in the same group are electrically connected by the same first wire; the second row of self-capacitance electrodes includes m groups of self-capacitance electrodes, each group includes n/m self-capacitance electrodes and the self-capacitance electrodes in the same group are electrically connected by the same second wire; wherein n/m self-capacitance electrodes in the same group in the second row of self-capacitance electrodes are respectively formed by self-capacitance electrodes, in the second row of self-capacitance electrodes, which are respectively in row adjacency with the self-capacitance electrodes of different groups in the first row of self-capacitance electrodes.

In the in-cell touch panel according to the second aspect of the present invention, the self-capacitance electrodes in each group of self-capacitance electrodes in the second row of self-capacitance electrodes are respectively in column adjacency to the self-capacitance electrodes having the same positional sequence in each group of self-capacitance electrodes in the first row.

In the in-cell touch panel according to the second aspect of the present invention, the shape of the self-capacitance electrode is a square or a rectangle having one side length to be twice the adjacent side length.

In the in-cell touch panel according to the second aspect of the present invention, said in-cell touch panel further comprises a plurality of additional self-capacitance electrodes, which are electrically connected to the touch sensing unit through an individual third wire.

According to a third aspect of the present invention, a touch detection method for use in the in-cell touch panel according to the present invention is provided, which comprises the following steps:

obtaining signals on corresponding adjacent self-capacitance electrodes through a first wire and a second wire, wherein when the array of self-capacitance electrodes is connected vertically to the touch sensing unit, adjacent self-capacitance electrodes refer to a certain self-capacitance electrode and the self-capacitance electrodes that are in row adjacency thereto; when the array of self-capacitance electrodes is connected horizontally to the touch sensing unit, adjacent self-capacitance electrodes refer to a certain self-capacitance electrode and the self-capacitance electrodes that are in column adjacency thereto; and determining a touch position according to signals on adjacent self-capacitance electrodes.

According to a fourth aspect of the present invention, a display device is provided, which comprises the above-described in-cell touch panel according to the present invention.

BRIEF DESCRIPTION OF THE DRAWINGS

The figures illustrated herein are provided for facilitating further understanding of the present invention, and they are a part of the prior art and the present invention. The schematic embodiments of the present invention and descriptions thereof are for explaining the present invention, but they do not intend to inappropriately limit the present invention. In the figures.

Figure 1:
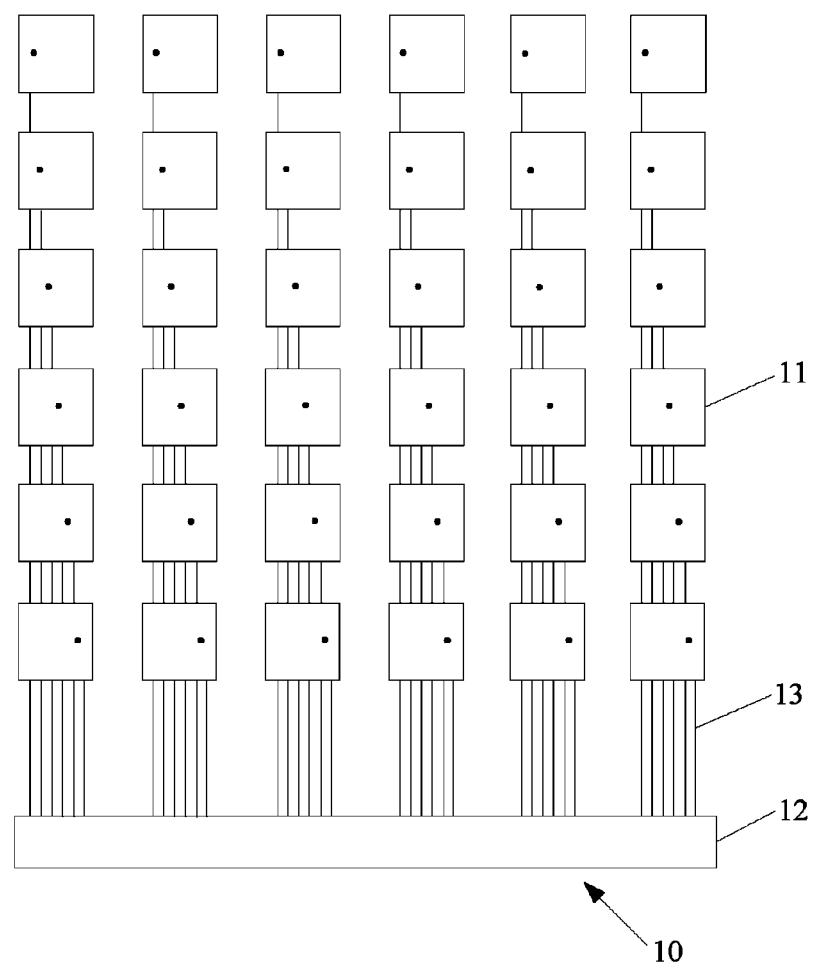
FIG. 1 is a structural diagram of an in-cell touch panel in the prior art.

The following reference numerals will be used throughout the Figures:

10: in-cell touch panel
11: self-capacitance electrode
12: touch sensing unit
13: wire
20: in-cell touch panel
21: self-capacitance electrode
22: touch sensing unit
23: wire
231: first wire
232 :second wire
24: first column of self-capacitance electrode
25: second column of self-capacitance electrode
26: third wire
7: first row of self-capacitance electrode
8: second row of self-capacitance electrode
21': additional self-capacitance electrode

DETAILED DESCRIPTION OF THE INVENTION

In order to further illustrate the in-cell touch panel, touch detection method and display device provided by embodiments of the present invention, detailed descriptions are given below with reference to the figures.

Figure 2:
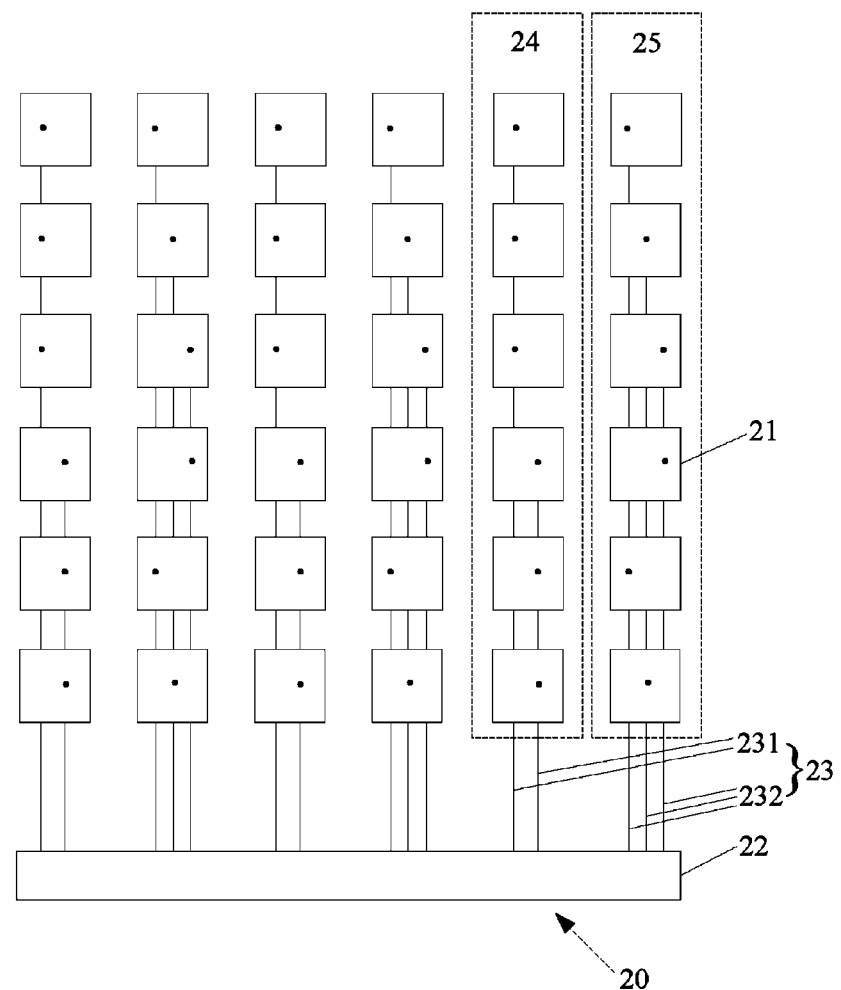
FIG. 2 is a structural diagram of an in-cell touch panel according to a first embodiment of the present invention.

FIG. 2 shows a structural diagram of an in-cell touch panel according to a first embodiment of the present invention. The in-cell touch panel 20 as shown in FIG. 2 comprises: a substrate (not shown), a plurality of self-capacitance electrodes 21 located on the substrate and arranged in an array, and a touch sensing unit 22 for determining the touch position by sensing capacitance value changes on the self-capacitance electrodes 21, wherein the self-capacitance electrodes 21 are electrically connected to the touch sensing unit 22 via a wire 23; the wire 23 includes a first wire 231 and a second wire 232, and the array of self-capacitance electrodes 21 comprises a first column 24 of self-capacitance electrodes and a second column 25 of self-capacitance electrodes arranged in alternation, the number of elements in each column 24, 25 of self-capacitance electrodes is n and there is a submutiple m of n, wherein n and m are both positive integers and n is greater than 1; the first column 24 of self-capacitance electrodes includes n/m groups of self-capacitance electrodes 21 divided in the sequence of column adjacency, each group includes m self-capacitance electrodes 21 and the self-capacitance electrodes 21 in the same group are electrically connected by the same first wire 231; the second column 25 of self-capacitance electrodes include m groups of self-capacitance electrodes, each group includes n/m self-capacitance electrodes 21 and the self-capacitance electrodes 21 in the same group are electrically connected by the same second wire 232, wherein n/m self-capacitance electrodes 21 in the same group are respectively formed by self-capacitance electrodes 21, in the second column 25 of self-capacitance electrodes, which are in row adjacency with the self-capacitance electrodes 21 of different groups in the first column 24 of self-capacitance electrodes.

As shown in FIG. 2, the black dots in each of the self-capacitance electrodes 21 schematically show the grouping and wiring of each column of self-capacitance electrodes 21 in the above-mentioned structure of array of self-capacitance electrodes. The self-capacitance electrodes 21 where the black dots with the same position and in the same column belong to the same group and are electrically connected by the same wire (first wire 231 or second wire 232). For example, in the first column 24, the black dots of the first three self-capacitance electrodes 21 have the same position (at the left side), which means that they belong to the same group and are electrically connected by the same first wire 231. In the second column 25, the black dots of the second and sixth self-capacitance electrodes 21 have the same position (at the middle), which means that they belong to the same group and are electrically connected by the same second wire 232.

In the above-mentioned touch panel 20, the value of m should be selected to be coordinated with the screen size and loading condition, and it is mainly determined by the required touch accuracy, namely, higher accuracy means a larger value of m.

In addition, in the in-cell touch panel 20 according to the present invention, the touch position can be determined through signals of two self-capacitance electrodes that are in row adjacency. Specifically, as shown in FIG. 2, suppose that the touch positions are in the first column 24 and the second column 25, obviously the azimuth or coordinate in the X direction can be directly detected, but both the first column 24 and the second column 25 have been grouped and the plurality of self-capacitance electrodes of the same group have been electrically connected, so it is impossible to directly detect the azimuth or coordinate in the Y direction accurately, in this case, the azimuth or coordinate of the touch position in the Y direction can be determined by means of the above-described ways of grouping and wiring of the self-capacitance electrodes of the first column 24 and the second column 25. For instance, first it is determined that the X azimuth of the touch position is in the first column 24 and the second column 25; then it is determined which row the Y azimuth is in, which involves, for example, first detecting that the touch position is in the first group of the first column 24, namely, in the first, second or third row, then determining that the touch position is in the first group of the second column 25, namely, in the first or fifth row, and then selecting an intersection of both to obtain that the touch position is in the first row, thus it can be determined that the touch positions (i.e. self-capacitance electrodes in row adjacency) are in the first row of the first column 24 and the first row of the second column 25. In this way, the touch position can be determined according to the way of grouping of the self-capacitance electrodes in the column of self-capacitance electrodes, namely, determining which two self-capacitance electrodes in row adjacency the touch position are in.

In the in-cell touch panel 20 according to the first embodiment of the present invention, the first column of self-capacitance electrodes 24 includes n/m groups of self-capacitance electrodes 21 altogether, so the number of wires needed is n/m; likewise, the second column of self-capacitance electrodes 25 includes m groups of self-capacitance electrodes 21 altogether, so the number of wires needed is m; thus the number of wires needed for connecting two adjacent columns 24, 25 of self-capacitance electrodes to the touch sensing unit 22 is n/m+m. As shown in FIG. 1, in the in-cell touch panel 10 of the prior art, each self-capacitance electrode 11 is connected to the touch sensing unit 13 through an individual wire 12, so when each column has n self-capacitance electrodes, the self-capacitance electrodes of two adjacent columns need 2n wires 12, and obviously 2n>n/m+m. Therefore, compared to the prior art, the in-cell touch panel 20 according to the first embodiment of the present invention significantly reduces the number of wires required for connecting the self-capacitance electrodes to the touch sensing unit so as to determine the touch position, and when n is large, the number reduction is more distinct.

Take the actual numbers shown in FIGS. 1 and 2 as an example, the number n of the self-capacitance electrodes is 6, and m=3, so in the in-cell touch panel 10 of the prior art as shown in FIG. 1, the number 2n of wires required for connecting two columns of self-capacitance electrodes 11 to the touch sensing unit 13 is 2×6=12, while in the in-cell touch panel 20 according to the first embodiment of the present invention as shown in FIG. 2, the number n/m+m of wires required for connecting two columns of self-capacitance electrodes 21 to the touch sensing unit 22 is 6/3+3=5, which is significantly less than the wire number 12 shown in FIG. 1.

Figure 3:
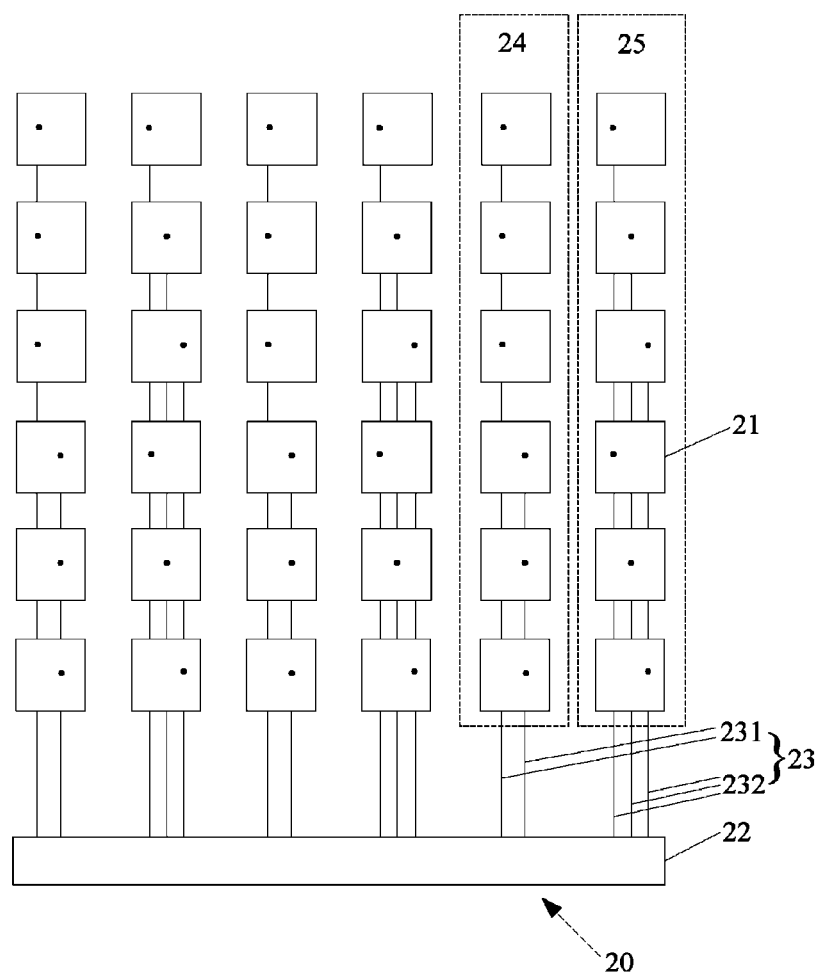
FIG. 3 is a structural diagram of an in-cell touch panel according to a second embodiment of the present invention.

FIG. 3 shows a structural diagram of an in-cell touch panel according to a second embodiment of the present invention. To realize neat wiring, in the embodiment shown in FIG. 3, the self-capacitance electrodes 21 of the second column 25 may preferably be grouped in the following manner: elements in each group of self-capacitance electrodes 21 of the second column 25 are respectively in row adjacency to the self-capacitance electrodes 21 having the same positional sequence in each group of self-capacitance electrodes 21 of the first column 24. As shown in FIG. 3, n/m self-capacitance electrodes 21 of each group in the second column 25 are respectively in row adjacency to the $i^{th}$ self-capacitance electrodes in each group of self-capacitance electrodes 21 of the first column 24, wherein i is a an integer greater or equal to 1 but smaller than or equal to m. Specifically, in FIG. 3, n=6 and m=3, i=1 or 2 or 3. When i=1, two elements of the first group in the second column 25 in FIG. 3 are respectively formed by the first and fourth self-capacitance electrodes 21 that are in row adjacency to the first element of each group in the first column 24; when i=2, two elements of the second group in the second column 25 in FIG. 3 are respectively formed by the second and fifth self-capacitance electrodes 21 that are in row adjacency to the second element of each group in the first column 24; when i=3, two elements of the third group in the second column 25 in FIG. 3 are respectively formed by the third and sixth self-capacitance electrodes 21 that are in row adjacency to the third element of each group in the first column 24. In this case, since the self-capacitance electrodes 21 of the same group are connected by the same wire, the symmetrical wiring as shown in FIG. 3 obtained by such way of grouping is neater and more methodic.

Figure 4:
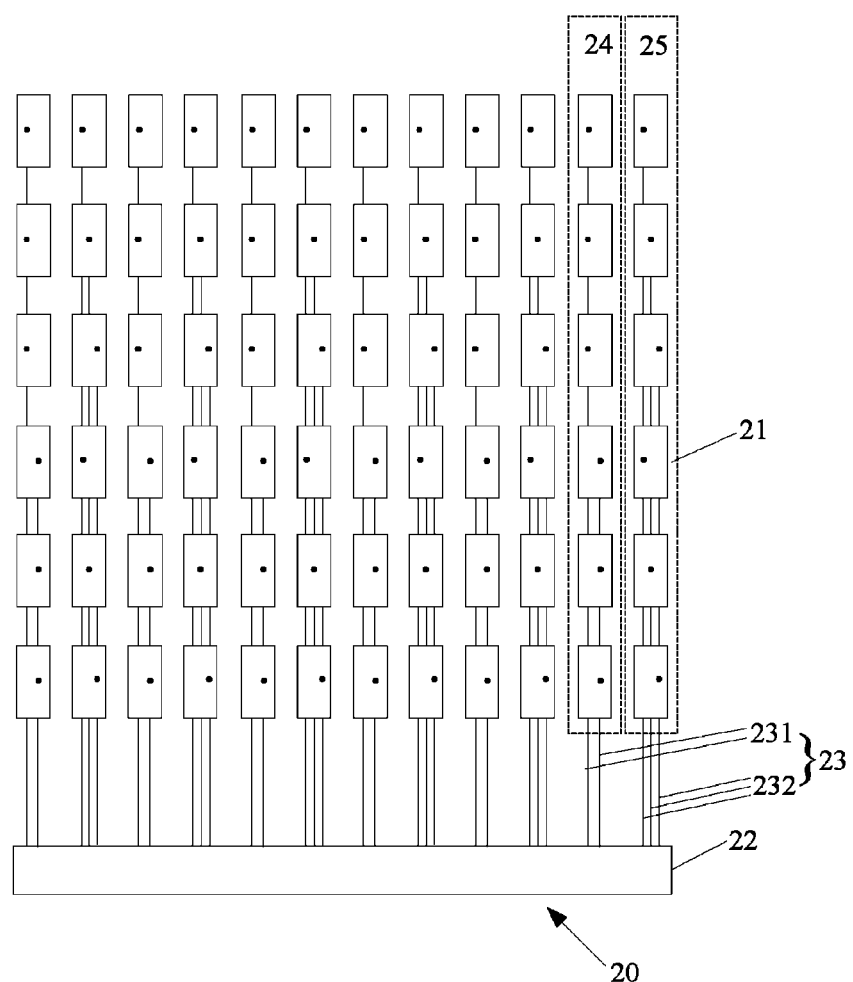
FIG. 4 is a structural diagram of an in-cell touch panel according to a third embodiment of the present invention.

FIG. 4 shows a structural diagram of an in-cell touch panel according to a third embodiment of the present invention. FIG. 4 shows a structure of cutting the self-capacitance electrode structure as shown in FIG. 3. Generally speaking, in order to increase the accuracy of determination of the touch position, as shown in FIG. 3, the shape of the self-capacitance electrode 21 is a square, or as shown in FIG. 4, the self-capacitance electrode 21 may also be a rectangle having one side length to be twice the adjacent side length. For example, the dimension of the square self-capacitance electrode 21 is 4 mm*4 mm or 5 mm*5 mm; or the dimension of the rectangular self-capacitance electrode 21 is 2 mm*4 mm.

Figure 5:
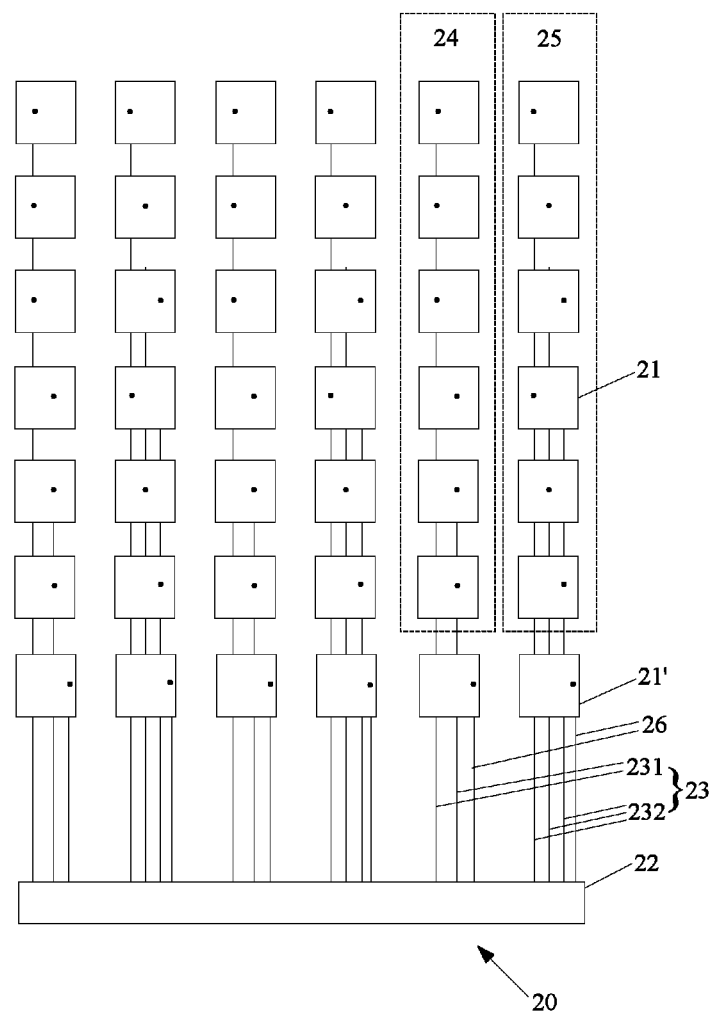
FIG. 5 is a structural diagram of an in-cell touch panel according to a fourth embodiment of the present invention.

FIG. 5 shows a structural diagram of an in-cell touch panel according to a fourth embodiment of the present invention. In order to better realize electrically connecting any number (especially a prime number) of self-capacitance electrodes 21 to the touch sensing unit 22 while reducing the number of wires 23, i.e. when the number n of each column of self-capacitance electrodes 21 is not an integral multiple of m or when n is a prime, as shown in FIG. 5, when m<n, n may be decomposed into n=m[n/m]+q, wherein [·] is a Gaussian function (rounding function), q is a remainder of n/m, and for the first m[n/m] self-capacitance electrodes 21 of the first and second columns, the grouping and wiring methods as shown in FIGS. 2-4 are adopted, while as for the remaining q self-capacitance electrodes 21, the prior art wiring method may be adopted to connect each of them to the touch sensing unit 22 via an individual wire respectively. Except for the similarities with FIG. 3, the in-cell touch panel 20 shown in FIG. 5 further comprises a plurality of self-capacitance electrodes 21', which are electrically connected to the touch sensing unit 22 via an individual third wire 26.

In the embodiments of the in-cell touch panel according to the present invention, the touch sensing unit 22 may be a touch sensing chip. Of course, the touch sensing unit 22 may also be other hardware devices or circuits having the touch sensing function.

Figure 6:
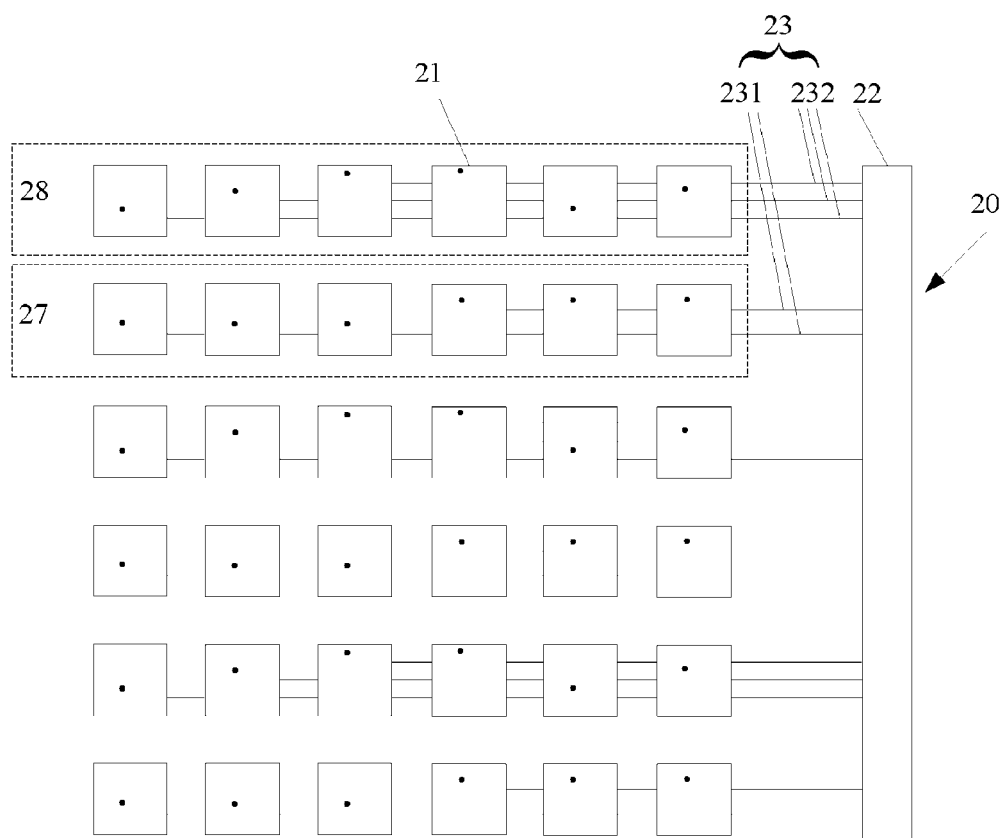
FIG. 6 is a structural diagram of an in-cell touch panel according to a fifth embodiment of the present invention.

FIG. 6 shows a structural diagram of an in-cell touch panel according to a fifth embodiment of the present invention. The in-cell touch panel according to the present invention as shown in FIG. 6 comprises a substrate (not shown), a plurality of self-capacitance electrodes 21 located on the substrate and arranged in an array, and a touch sensing unit 22 for determining the touch position by sensing capacitance value changes on the self-capacitance electrodes 21, wherein the self-capacitance electrodes 21 are electrically connected to the touch sensing unit 22 via wires 23; the wires 23 includes a first wire 231 and a second wire 232, and the array of self-capacitance electrodes 21 comprises a first row 27 of self-capacitance electrodes and a second row 28 of self-capacitance electrodes arranged in alternation, the number of elements in each row 27, 28 of self-capacitance electrodes is n and there is a submultiple m of n, wherein n and m are both positive integers and n is greater than 1; the first row 27 of self-capacitance electrodes includes n/m groups of self-capacitance electrodes 21 divided in the sequence of row adjacency, each group includes m self-capacitance electrodes 21 and the self-capacitance electrodes 21 in the same group are electrically connected by the same first wire 231; the second row 28 of self-capacitance electrodes include m groups of self-capacitance electrodes 21, each group includes n/m self-capacitance electrodes 21 and the self-capacitance electrodes 21 in the same group are electrically connected by the same second wire 232, wherein n/m self-capacitance electrodes 21 in the same group are respectively formed by self-capacitance electrodes 21, in the second row 28 of self-capacitance electrodes, which are in row adjacency with the self-capacitance electrodes 21 of different groups in the first row 27 of self-capacitance electrodes.

The in-cell touch panel 20 as shown in FIG. 6 is similar to that shown in FIG. 2 in terms of structure, and the difference is that FIG. 2 is a vertical wiring, while FIG. 6 is a horizontal wiring, namely, columns are changed into rows. Thus similarly, the number of wires required for connecting two adjacent rows of self-capacitance electrodes 21 to the touch sensing unit 22 is n/m+m, which reduces the number of wires required as compared to the number of 2n wires required in the prior art. Therefore, compared to the prior art, the in-cell touch panel 20 according to the fifth embodiment of the present invention can also significantly reduce the number of wires required for connecting the self-capacitance electrodes to the touch sensing unit so as to determine the touch position.

Figure 7:
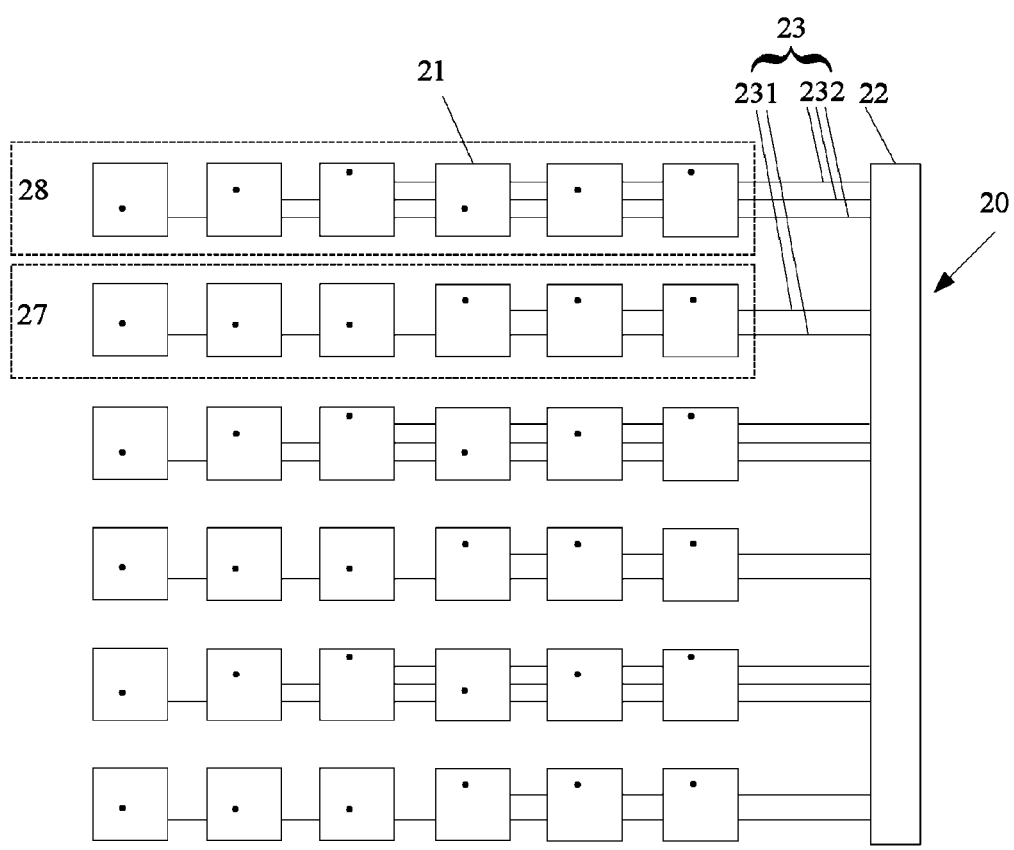
FIG. 7 is a structural diagram of an in-cell touch panel according to a sixth embodiment of the present invention.

To realize neat wiring, similar to the embodiment shown in FIG. 3, FIG. 7 shows a structural diagram of an in-cell touch panel according to a sixth embodiment of the present invention. As shown in FIG. 7, the self-capacitance electrodes 21 of the second row 28 may preferably be grouped in the following manner: elements in each group of self-capacitance electrodes 21 of the second row 28 are respectively in row adjacency to the self-capacitance electrodes 21 having the same positional sequence in each group of self-capacitance electrodes 21 of the first row 27. As shown in FIG. 7, n/m self-capacitance electrodes 21 of each group in the second row 28 are respectively in row adjacency to the $i^{th}$ self-capacitance electrodes in each group of self-capacitance electrodes 21 of the first row 27, wherein i is a an integer greater or equal to 1 but smaller than or equal to m. Specifically, in FIG. 7, n=6 and m=3, i=1 or 2 or 3. When i=1, two elements of the first group in the second row 28 are respectively formed by the first and fourth self-capacitance electrodes 21 that are in row adjacency to the first element of each group in the first row 27; when i=2, two elements of the second group in the second row 28 are respectively formed by the second and fifth self-capacitance electrodes 21 that are in row adjacency to the second element of each group in the first row 27; when i=3, two elements of the third group in the second row 28 are respectively formed by the third and sixth self-capacitance electrodes 21 that are in row adjacency to the third element of each group in the first row 27. In this case, since the self-capacitance electrodes 21 of the same group are connected by the same wire, the symmetrical wiring as shown in FIG. 7 obtained by such way of grouping is neater and more methodic.

Figure 8:
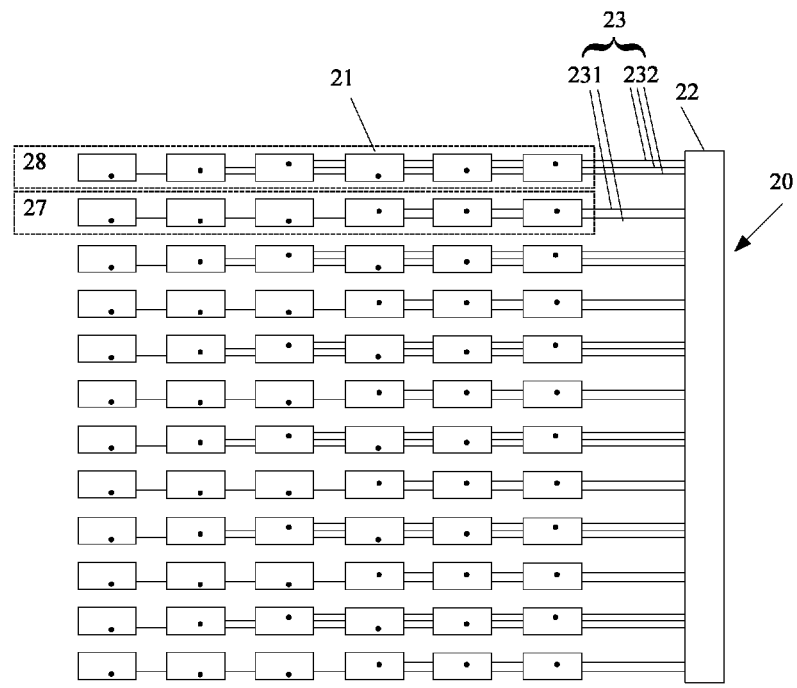
FIG. 8 is a structural diagram of an in-cell touch panel according to a seventh embodiment of the present invention.

FIG. 8 is a structural diagram of an in-cell touch panel according to a seventh embodiment of the present invention. Generally speaking, in order to increase the accuracy of determination of the touch position, as shown in FIGS. 3 and 7, the shape of the self-capacitance electrode 21 is a square, or similar to FIG. 4, as shown in FIG. 8, the self-capacitance electrode 21 may also be a rectangle having one side length to be twice the adjacent side length. For example, the dimension of the square self-capacitance electrode 21 is 4 mm*4 mm or 5 mm*5 mm; or the dimension of the rectangular self-capacitance electrode 21 is 2 mm*4 mm.

Figure 9:
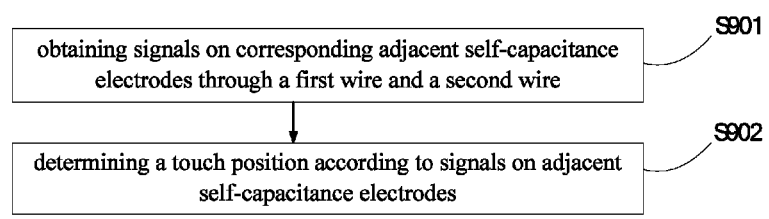
FIG. 9 is a flow chart of a touch detection method according to an embodiment of the present invention.

FIG. 9 is a flow chart of a touch detection method according to an embodiment of the present invention for use in the in-cell touch panel according to the present invention. As shown in FIG. 9, the touch detection method according to an embodiment of the present invention comprises:

S901 obtaining signals on corresponding adjacent self-capacitance electrodes through a first wire and a second wire;

S902 determining a touch position according to signals on adjacent self-capacitance electrodes.

In step S901, adjacent self-capacitance electrodes refer to a certain self-capacitance electrode and the self-capacitance electrodes that are in row (column) adjacency thereto. Specifically, when the array of self-capacitance electrodes is connected vertically to the touch sensing unit, adjacent self-capacitance electrodes refer to a certain self-capacitance electrode and the self-capacitance electrodes that are in row adjacency thereto; when the array of self-capacitance electrodes is connected horizontally to the touch sensing unit, adjacent self-capacitance electrodes refer to a certain self-capacitance electrode and the self-capacitance electrodes that are in column adjacency thereto;

In step S902, the touch position can be determined by means of the method for determining the touch position using the self-capacitance electrodes that are in row adjacency as described above with reference to FIG. 2.

For example, as shown in FIG. 3, in the structure of in-cell touch panel 20 according to the present invention, the $1^{st}$, $2^{nd}$, $6^{th}$, $7^{th}$, $11^{th}$ and $12^{th}$ wires from left to right are all the first wire 231, the $3^{rd}$, $4^{th}$, $5^{th}$, $8^{th}$, $9^{th}$, $10^{th}$, $13^{th}$, $14^{th}$ and $15^{th}$ wires are all the second wire 232. If the first wire 231 and the second wire 232 are respectively the $1^{st}$ and $3^{rd}$ wires, then the corresponding adjacent self-capacitance electrodes 21 are the first and second self-capacitance electrodes 21 in the first row; if the first wire 231 and the second wire 232 are respectively the $2^{nd}$ and $5^{th}$ wires, then the corresponding adjacent self-capacitance electrodes 21 are the first and second self-capacitance electrodes 21 in the sixth row.

Another example is that, as shown in FIG. 7, the $4^{th}$, $5^{th}$, $9^{th}$, $10^{th}$, $14^{th}$, and $15^{th}$ wires from top to bottom are all the first wire 231, and the $1^{st}$, $2^{nd}$, $3^{rd}$, $6^{th}$, $7^{th}$, $8^{th}$, $11^{th}$, $12^{th}$ and $13^{th}$ wires are all the second wire 232. If the first wire 231 and the second wire 232 are respectively the $5^{th}$ and $3^{rd}$ wires, then the corresponding adjacent self-capacitance electrodes 21 are the first and second self-capacitance electrodes 21 in the first column; if the first wire 231 and the second wire 232 are respectively the $10^{th}$ and $7^{th}$ wires, then the corresponding adjacent self-capacitance electrodes 21 are the third and fourth self-capacitance electrodes 21 in the second column. In the touch detection method according to the above embodiment of the present invention for use in the in-cell touch panel according to the present invention, the number of wires required for connecting two adjacent columns (or rows) of self-capacitance electrodes to the touch sensing unit is n/m+m, and compared to the 2n wires required in the prior art, the number of wires required for determining the touch position is reduced.

In addition, an embodiment of the present invention also provides a display device, which comprises the above-mentioned in-cell touch panel 20 according to the embodiment of the present invention. Based on the above analysis, in the display device according to the embodiment of the present invention, the number of wires required for connecting two adjacent columns (or rows) of self-capacitance electrodes to the touch sensing unit is n/m+m, and compared to the 2n wires required in the prior art, the number of wires required for connecting the self-capacitance electrodes to the touch sensing unit for determining the touch position is reduced.

In the above descriptions of the embodiments, the specific features, structures, materials or characteristics may be combined in an appropriate manner in any one or more embodiments or examples.

The above described are merely specific embodiments of the present invention, but the protection scope of the present invention is not limited to these. Any variations or substitutions that can be easily conceived by a person skilled in the art within the scope of technology disclosed by the present invention shall fall into the protection scope of the present invention. Therefore, the protection scope of the present invention shall be determined by the protection scope of the appended claims.

The invention claimed is:

1. An in-cell touch panel, comprising: a substrate, a plurality of self-capacitance electrodes located on the substrate and arranged in an array, and a touch sensing unit for determining the touch position by sensing capacitance value changes on the self-capacitance electrodes, the self-capacitance electrodes being electrically connected to the touch sensing unit via wires including a first wire and a second wire; wherein the array of the self-capacitance electrodes comprises a first column of self-capacitance electrodes and a second column of self-capacitance electrodes arranged in alternation, the number of elements in each column of self-capacitance electrodes is n and there is a submultiple m of n, wherein n and m are both positive integers and n is greater than 1, and the first column of self-capacitance electrodes includes n/m groups of self-capacitance electrodes divided in the sequence of column adjacency, each group includes m self-capacitance electrodes and the self-capacitance electrodes in the same group are electrically connected by the same first wire; the second column of self-capacitance electrodes include m groups of self-capacitance electrodes, each group includes n/m self-capacitance electrodes and the self-capacitance electrodes in the same group are electrically connected by the same second wire; wherein n/m self-capacitance electrodes in the same group in the second column of self-capacitance electrodes are respectively formed by self-capacitance electrodes, in the second column of self-capacitance electrodes, which are in row adjacency with the self-capacitance electrodes of different groups in the first column of self-capacitance electrodes.

2. The in-cell touch panel according to claim 1, wherein the self-capacitance electrodes in each group of self-capacitance electrodes in the second column of self-capacitance electrodes are respectively in row adjacency to the self-capacitance electrodes having the same positional sequence in each group of self-capacitance electrodes in the first column.

3. The in-cell touch panel according to claim 1, wherein the shape of the self-capacitance electrode can be a square or a rectangle having one side length to be twice the adjacent side length.

4. The in-cell touch panel according to claim 1, wherein said in cell touch panel further comprises a plurality of additional self-capacitance electrodes, which are electrically connected to the touch sensing unit through an individual third wire.

5. A touch detection method for use in the in-cell touch panel according to claim 1, comprising the following steps:
obtaining signals on corresponding adjacent self-capacitance electrodes through a first wire and a second wire, wherein when the array of self-capacitance electrodes is connected vertically to the touch sensing unit, adjacent self-capacitance electrodes refer to a certain self-capacitance electrode and the self-capacitance electrodes that are in row adjacency thereto; when the array of self-capacitance electrodes is connected horizontally to the touch sensing unit, adjacent self-capacitance electrodes refer to a certain self-capacitance electrode and the self-capacitance electrodes that are in column adjacency thereto; and determining a touch position according to signals on adjacent self-capacitance electrodes.

6. A display device, comprising the in-cell touch panel according to claim 1.

7. An in-cell touch panel, comprising: a substrate, a plurality of self-capacitance electrodes located on said substrate and arranged in an array, and a touch sensing unit for determining the touch position by sensing capacitance value changes on the self-capacitance electrodes, the self-capacitance electrodes being electrically connected to the touch sensing unit via wires including a first wire and a second wire; wherein the array of self-capacitance electrodes comprises a first row of self-capacitance electrodes and a second row of self-capacitance electrodes arranged in alternation, the number of elements in each row of self-capacitance electrodes is n and there is a submultiple m of n, wherein n and m are both positive integers and n is greater than 1, and the first row of self-capacitance electrodes includes n/m groups of self-capacitance electrodes divided in the sequence of row adjacency, each group includes m self-capacitance electrodes and the self-capacitance electrodes in the same group are electrically connected by the same first wire; the second row of self-capacitance electrodes includes m groups of self-capacitance electrodes, each group includes n/m self-capacitance electrodes and the self-capacitance electrodes in the same group are electrically connected by the same second wire; wherein n/m self-capacitance electrodes in the same group in the second row of self-capacitance electrodes are respectively formed by self-capacitance electrodes, in the second row of self-capacitance electrodes, which are in row adjacency with the self-capacitance electrodes of different groups in the first row of self-capacitance electrodes.

8. The in-cell touch panel according to claim 7, wherein the self-capacitance electrodes in each group of self-capacitance electrodes in the second row of self-capacitance electrodes are respectively in column adjacency to the self-capacitance electrodes having the same positional sequence in each group of self-capacitance electrodes in the first row.

9. The in-cell touch panel according to claim 7, wherein the shape of the self-capacitance electrode is a square or a rectangle having one side length to be twice the adjacent side length.

10. The in-cell touch panel according to claim 7, wherein said in-cell touch panel further comprises a plurality of additional self-capacitance electrodes, which are electrically connected to the touch sensing unit through an individual third wire.

* * * * *